United States Patent [19]

Rollett

[11] Patent Number: 5,246,196

[45] Date of Patent: Sep. 21, 1993

[54] MEANS FOR MOUNTING A CASING, IN PARTICULAR THAT OF A HEATING AND/OR AIR CONDITIONING APPARATUS, ON A BASE STRUCTURE, FOR EXAMPLE THE BODYWORK OF A MOTOR VEHICLE

[75] Inventor: Gérard Rollett, Montigny-le-Bretonneux, France

[73] Assignee: Valeo Thermique Habitacle, Le Mesnil-Saint Denis, France

[21] Appl. No.: 824,201

[22] Filed: Jan. 22, 1992

[30] Foreign Application Priority Data

Jan. 24, 1991 [FR] France ................ 91 00818

[51] Int. Cl.⁵ .............................................. F16M 7/00
[52] U.S. Cl. .................. 248/674; 248/225.1; 248/224.3; 403/282; 403/345
[58] Field of Search ............ 248/674, 225.1, 221.4, 248/224.3, 314, 277.2, 298; 403/282, 279, 345, 381, 315

[56] References Cited

U.S. PATENT DOCUMENTS 1,115,492 11/1914 Bond ............................ 248/224.3 X
4,412,636 11/1983 Greene ......................... 248/224.3 X

FOREIGN PATENT DOCUMENTS 0378851 12/1989 European Pat. Off. .
3835543 11/0988 Fed. Rep. of Germany .
2409408 11/1977 France .
2608101 10/1986 France .

Primary Examiner—Blair M. Johnson
Attorney, Agent, or Firm—Morgan & Finnegan

[57] ABSTRACT

A heating or air conditioning apparatus for a motor vehicle includes a casing which is mounted on the bodywork of the vehicle by a mounting means comprising a mounting foot carried by the casing and fitting in a U-shaped support member which is carried by the bodywork of the vehicle.

The mounting foot is a hollow profiled element which includes a flat rigid wall defining a reference face and joined to a deformable curved wall of the mounting foot which is concave towards the flat wall, both walls being engaged against respective opposed faces of the support member. The mounting foot is integral with a shoe portion which is attached to the casing by slide elements of the former gripping two rails of the casing.

10 Claims, 1 Drawing Sheet

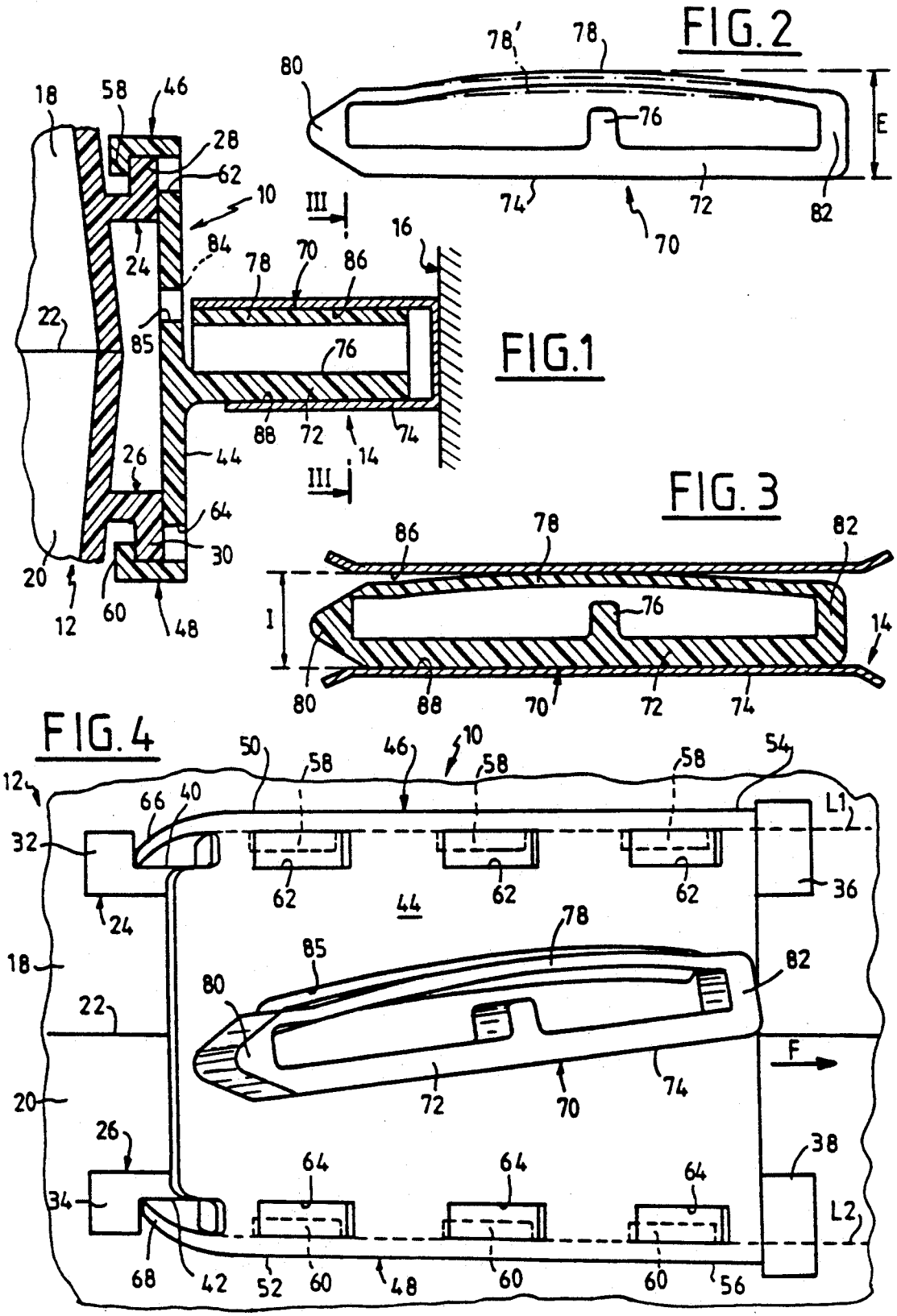

MEANS FOR MOUNTING A CASING, IN PARTICULAR THAT OF A HEATING AND/OR AIR CONDITIONING APPARATUS, ON A BASE STRUCTURE, FOR EXAMPLE THE BODYWORK OF A MOTOR VEHICLE

FIELD OF THE INVENTION

This invention relates to an assembly comprising a casing mounted on a base structure, and is directed more particularly to the mounting means for mounting the casing on the base structure. The casing is typically a casing of a heating and/or air conditioning apparatus for a motor vehicle, the base structure being typically the bodywork of the motor vehicle.

BACKGROUND OF THE INVENTION

It is known in such an assembly to use at least one mounting foot which is attached to the casing and which is adapted to engage in a U-shaped support member carried by the bodywork of a motor vehicle. In known arrangements of this kind, the mounting foot is formed integrally, for example by moulding, with the casing or with a component of the casing. Such a mounting foot is generally rigid, so as to give it a high resistance against forces to which the casing may be subjected during the working life of the vehicle. Because of this rigidity, the mounting foot is unable to compensate for dimensional variations that may occur as between different U-shaped support members, both during manufacture of the latter in mass production and during fitting on the motor vehicles on the assembly line.

The result of this can be that fitting is impossible, or alternatively that a clearance exists between the mounting foot and the U-shaped support member, such as to set up vibrations and noise which are detrimental to proper operation of the apparatus carried by the casing, besides being detrimental to the comfort of the occupants of the vehicle. In addition, the presence of any such clearance may result in the mounting foot eventually becoming dislodged from the U-shaped support member, so that the casing may actually become detached from, and fall off, the bodywork.

Again, in cases in which the casing is fitted to the bodywork with a sealing member being interposed such as to ensure sealing attachment of the casing to the bodywork, the above mentioned clearance may cause leakage of air from within the casing.

Given that in the known arrangements the mounting foot is integral with the casing or with a component of the casing, the presence of an ill-fitting mounting foot results in a need to change either the whole casing or at least the component of the latter that carries the mounting foot.

DISCUSSION OF THE INVENTION

A main object of the invention is to overcome the drawbacks mentioned above.

In particular, an object of the invention is to provide a mounting means which avoids the occurrence of any clearance between the mounting foot and the U-shaped support member.

Another object of the invention is to provide a mounting means in which the dimensional variations that may occur as between one U-shaped support member and another, as mentioned above, are compensated for.

A further object of the invention is to provide a mounting means in which any fitting errors between the apparatus which includes the casing, on the one hand, and the bodywork of the corresponding vehicle on the other hand, can be taken up.

Yet another object of the invention is to provide a mounting means which is such that the mounting foot cannot be dislodged from the U-shaped support member, inadvertently or accidentally.

To this end the invention is defined in terms of a mounting means for a casing, for example for mounting a casing of a heating and/or air conditioning apparatus on the bodywork of a motor vehicle, wherein the mounting means includes at least one mounting foot attached to the casing and arranged to be engaged in a U-shaped support member projecting from the bodywork.

According to an essential feature of the invention, such a mounting means is characterised in that the mounting foot is in the form of a hollow profiled element having a flat, rigid wall defining a reference face and joined to a deformable, curved wall of the profiled element, the curved wall being concave towards the said flat wall, with the flat wall and the curved wall being adapted to engage respectively against two opposed faces of the said U-shaped support member.

Because the mounting foot has two opposed walls, one of which is rigid and defines the said reference face, with its other wall being deformable, the mounting foot is able to compensate for the dimensional variations, with respect to its nominal dimensions, that may occur in the U-shaped support members as discussed above, and is also able to enable fitting errors to be corrected as between the apparatus that includes the casing on the one hand, and the vehicle on the other hand.

According to a preferred feature of the invention, the mounting foot is carried by a shoe portion having two slide elements spaced apart from each other and adapted to engage respectively on two rails of the casing. The shoe portion and the mounting foot thus form a monobloc assembly which is separate from the casing and which can be attached to the latter before the casing is mounting on the bodywork of the vehicle.

According to another preferred feature of the invention, the flat, rigid wall has a thickness which is greater than that of the deformable curved wall. Preferably, the flat, rigid wall is reinforced by at least one rib extending within, and along the length of, the hollow profiled element.

In accordance with a further preferred feature of the invention, the mounting foot is attached to the shoe portion by means of its flat rigid wall, which facilitates the subsequent deformation of the curved wall of the mounting foot.

Preferably, however, the mounting foot being formed integrally by moulding with the shoe portion, for example in a plastics material, the deformable curved wall is initially attached to the shoe portion by a thin, integral web which is adapted to be ruptured once the curved wall is subjected to deformation.

According to yet another preferred feature of the invention, the deformable curved wall has a relaxed position in which the greatest thickness of the profiled element, considered in a direction at right angles to that of the reference face, is greater than the width of the gap that separates the two opposed faces of the U- shaped support member. In this way it is ensured that the mounting foot must always be engaged in compression between the two opposed faces of the U-shaped support member.

According to yet a further preferred feature of the invention, each of the two said rails of the casing has an anterior end for the introduction of a respective said slide element of the shoe portion, and a posterior end defining an abutment for the corresponding slide element when the latter is fully received on the rail, the two said rails being convergent from their posterior ends towards their anterior ends, and the two slide elements being convergent from their posterior ends towards their anterior ends.

Preferably, each of the said rails is formed at its anterior end with a notch which is adapted to cooperate with a deformable tongue formed at the anterior end of the corresponding slide element, for preventing removal of the shoe portion from the casing once the slide elements and rails have been fully engaged with each other. With this arrangement, there is a cantilevered joint between the slide elements of the shoe portion on the one hand and the rails of the casing on the other hand.

The mounting means of the invention is applicable in particular to the fitting of a casing which consists of two casing halves assembled together. In such a case, it is of particular advantage to arrange that the two rails are formed respectively on the two casing halves. The shoe portion then helps to hold the two halves of the casing together and plays an active part in the assembly of the casing.

A preferred embodiment of the invention will be described below, by way of example only and with reference to the accompanying drawings.

BRIEF DESCRIPTION OF THE DRAWINGS

FIG. 1 is a view in cross section showing part of the assembly of a casing on the bodywork of a motor vehicle, using a mounting means in accordance with the invention.

FIG. 2 is a view in profile of the mounting foot in the mounting means of FIG. 1.

FIG. 3 is a view in cross section taken on the line III—III in FIG. 1.

FIG. 4 is a view in elevation showing the mounting means of the invention fitted on the casing itself.

DESCRIPTION OF A PREFERRED EMBODIMENT OF THE INVENTION

Reference is first made to FIG. 1, which shows a mounting means 10 in accordance with the invention, whereby a casing 12, which is typically (but by way of non-limiting example) a casing for a heating and/or air conditioning apparatus, and which is mounted on a U-shaped support member 14 secured on the bodywork 16 of a motor vehicle.

In this example, and as can be seen from FIGS. 1 and 4, the casing 12 is made in two halves 18 and 20, which are assembled together on either side of an assembly plane 22. In this example each of the two casing halves 18 and 20 is made by moulding in a suitable plastics material. The casing halves 18 and 20 include two rails 24 and 26 respectively, the rails being spaced away from each other and disposed symmetrically with respect to the assembly plane 22. The rails 24 and 26 have an L-shaped cross section, and are formed with wing portions 28 and 30 respectively. These wing portions are directed in opposite directions when the two casing halves 18 and 20 are assembled together.

The rails 24 and 26 have respective anterior ends 32 and 34, and respective posterior ends 36 and 38 which define end abutments, see FIG. 4. The two rails 32 and 34 are rectilinear but not parallel with each other. They converge from their posterior ends 36 and 38 towards their anterior ends 32 and 34 as indicated by the lines L1 and L2 in FIG. 4. In addition, the rail 24 has a notch 40 formed at its anterior end 32, while the rail 26 has a similar notch 42 formed at its anterior end 34. These notches 40 and 42 are formed in the wing portion of the rail, for a purpose which will appear in due course from this description.

The mounting means 10 includes a substantially rectangular shoe portion 44 which is formed with two slide elements 46 and 48 spaced from each other and arranged so as to engage with the two rails 24 and 26 respectively of the casing 12, see FIGS. 1 and 4. The slide elements 46 and 48 have anterior ends 50 and 52 respectively, and posterior ends 54 and 56 respectively. The slide element 46 consists of three lugs 58 for engaging behind the wing portion 28 of the rail 24, and the slide element 48 similarly consists of three lugs 60 for engaging behind the wing portion 30 of the rail 26.

In the present example, the mounting means 10 is formed as a single component by moulding in a suitable plastics material. The shoe portion 44 is formed with three apertures 62, which are generally rectangular in shape and which are aligned with the lugs 58. It is also formed with three further apertures 64, again generally rectangular in shape and in line with the lugs 60. This arrangement enables the component to be stripped in a simple manner from the mould.

The anterior ends 50 and 52 of the slide elements 46 and 48 are extended by deformable tongues 66 and 68, FIG. 4, which converge towards each other and which are arranged to relax into engagement in the respective notches 40 and 42 of the rails 24 and 26 once the shoe portion 44 has been fully introduced on to the two halves 18 and 20 of the casing. Thus, after the slide elements 46 and 48 of the shoe portion 44 have been engaged on the rails 24 and 26 of the casing in the direction of the arrow F (FIG. 4), the shoe portion 44 comes into engagement against the posterior end stop abutments 36 and 38 of the two rails, with the tongues 66 and 68 coming into cooperation with the notches 40 and 42 respectively as mentioned above and as shown in FIG. 4. These notches thus lock the shoe portion 44 in position and prevent it from being withdrawn from the casing. In addition, because of the convergent configuration of the two rails 24 and 26 and slide elements 46 and 48, when the shoe portion 4 is being introduced it exerts a gripping action on the two casing halves 18 and 20, thus tending to urge them closer together and therefore playing a part in the tight assembly of the two halves of the casing.

The mounting means 10 also includes a mounting foot 70, which as can be seen from FIGS. 1 and 2 is in the form of a hollow profiled element joined to the shoe portion 44. The mounting foot 70 is in fact formed integrally with the shoe portion 44, and extends in a direction which is substantially at right angles to the plane of the shoe portion 44. The mounting foot 70 is delimited by walls having parallel generatrices, and its profile has the cross section seen in FIG. 2. The mounting foot 70 includes a substantially flat and rigid wall 72 which defines a flat reference face 74 on its outer side. The wall 72 is reinforced by a rib 76 which projects into the interior of the hollow profiled mounting foot, over the whole length of the latter (see FIG. 1), in order to increase the rigidity of the wall 72.

In addition, the mounting foot 70 includes a deformable curved wall 78 which is opposite the flat and rigid wall 72, and which is concave towards the latter. The thickness of the wall 78 is smaller than that of the wall 72, in order to enable it to deform. The wall 78 is joined to the wall 72 through two end walls arranged parallel to each other, namely a tapered anterior end wall 80 and a U-shaped posterior end wall 82. The mounting foot 70 thus has a profile which is somewhat similar to that of an aircraft wing.

As shown in FIG. 1, the mounting foot 70 is joined to the shoe element 44 by means only of its flat and rigid wall 72, including its reinforcing rib 76. It should be noted that the flexible wall 78 is accordingly detached from the shoe element 44, so as to enable it to deform. The deformable curved wall 78 is however, preferably, initially attached to the shoe portion 44 by means of an integral, thin web formed during moulding and capable of being ruptured once the wall 78 is subjected to deformation. This web (not shown) is arranged in a position indicated at 84 in FIG. 1, at the edge of an aperture 85 in the shoe portion 44.

After the component has been stripped from the mould, the curved deformable wall 78 has a relaxed position as indicated in full lines in FIG. 2. In this position, the greatest overall thickness E of the mounting foot 70 in a direction at right angles to that of the reference face 74, is greater than the width I that separates two opposed faces 86 and 88 of the U-shaped support member 14, as can be seen in FIG. 3. This greatest overall thickness E of the mounting foot 70 is so selected that it is always greater than the width I having regard to manufacturing tolerances and dimensional variations to which the U-shaped support members may be liable, and having regard to the fact that they are made by mass production methods.

The wall 78 of the mounting foot 70 is able to deform towards the opposite wall 72, so that it can adopt any appropriate deformed shape, for example that shown in phantom lines in FIG. 2 and indicated at 78'. Thus, when the mounting foot is introduced into the U-shaped support member 14, the reference face 74 of the wall 72 is engaged against the inner face 88 of the support member 14, while the wall 78 becomes deformed so as to exert a pressure on the opposite inner face 86 of the support member 14, as can be seen in FIG. 3.

The mounting means 10 is employed in the following manner. After its shoe portion 44 has been fitted on to the casing 12 by engagement of the slide elements 46 and 48 with the rails 24 and 26, the mounting foot 70 is then simply inserted into the gap between the two faces 86 and 88 of the U-shaped support member 14. Since the wall 78 is deformable, it will at once adapt its shape to that of the U-shaped support member 14 regardless of the dimensions of the gap I. In this way, the dimensional variations in the support member 14, with respect to its nominal dimensions, are compensated for, and at the same time any positioning errors as between the casing 12 and the bodywork 16 of the vehicle can be corrected.

Once the mounting foot 70 has been fitted in place, the casing 12 is then unable to be detached from the vehicle bodywork. In this connection, the support member 14 cannot be detached from the casing 12, due to the tongues 66 and 68 which form a non-return lock.

In addition, the mounting foot 70 exerts a gripping action within the U-shaped support member 14. It should also be noted that the convergent arrangement of the rails and slide elements, and the presence of the deformable tongues, together ensure that no fitting error can occur in the location of the shoe portion on the casing.

The casing 12 may be equipped with one or more mounting means 10, according to the design requirements for the vehicle concerned.

The invention is of course not limited to the embodiment described above and shown in the drawings, but extends to other variants as well. In particular, the rails 24 and 26 may both be formed on the same component of the casing instead of on two separate halves as described. Similarly, the mounting foot 70 may be joined directly to the casing 12 instead of being supported through a shoe arrangement.

What is claimed is:

1. An assembly comprising a base structure, a casing, and mounting means mounting the casing on the base structure, wherein the mounting means comprises at least one U-shaped support member carried by the base structure, at least one mounting foot engageable in the U-shaped support member, and means attaching the mounting foot to the said casing, the mounting foot being in the form of a hollow profiled element comprising a flat rigid wall defining a reference face, a deformable curved wall opposite to the flat rigid wall and concave towards the latter, and portions of the profiled element joining the two said walls together in spaced relationship, the U-shaped support member having two opposed faces for engagement of the flat wall and curved wall respectively therewith.

2. An assembly according to claim 1, wherein the means joining the mounting foot to the casing comprise a shoe portion carrying the mounting foot and having two slide elements spaced apart from each other, and two rails formed on the casing, with each slide element engaging a respective one of the said rails.

3. An assembly according to claim 1, wherein the flat rigid wall has a thickness which is greater than that of the deformable curved wall.

4. An assembly according to claim 1, further including a rib joined to the flat rigid wall and extending within and along the length of the said hollow profiled element.

5. An assembly according to claim 2, wherein the said flat rigid wall joins the mounting foot to the shoe portion.

6. An assembly according to claim 5 when in an initial disassembled state, further including a thin integral web joining the said deformable curved wall to the shoe portion, the mounting foot being integral with the shoe portion and the said thin web being rupturable when the said curved wall is deformed as the mounting foot is first introduced into the U-shaped support member.

7. An assembly according to claim 1, wherein the U-shaped support member defines two opposed faces for engagement with the said flat wall and curved wall respectively of the mounting foot, the curved wall being such that, in a relaxed position thereof, the greatest overall thickness of the hollow profiled element in a direction at right angles to that defined by the said reference face is greater than the distance between the two opposed faces of the U-shaped support member.

8. An assembly according to claim 2, wherein each said rail of the casing defines an anterior end for introduction of a corresponding said slide element of the shoe portion on to it, and a posterior end defining an end abutment for the said slide element once the latter is fully introduced, the two rails being convergent from their posterior ends to their anterior ends, with each said slide element also defining a posterior end and an anterior end, the two slide elements being convergent from their posterior ends towards their anterior ends.

9. An assembly according to claim 8, wherein each said rail is formed at its anterior end with a notch, with each slide element having a deformable tongue formed at its anterior end for engagement in the corresponding said notch whereby to prevent removal of the shoe portion from the casing once the said slide elements and rails have been fully engaged together.

10. An assembly according to claim 2, wherein the casing comprises two casing halves assembled together, each said rail being formed on a respective one of the said casing halves.

* * * * *